United States Patent [19]

Aoki

[11] Patent Number: 4,655,622
[45] Date of Patent: Apr. 7, 1987

[54] PRINTER CONTROL APPARATUS

[75] Inventor: Hiroyuki Aoki, Hannou, Japan

[73] Assignee: Kabushiki Kaisha Toshiba, Kawasaki, Japan

[21] Appl. No.: 761,705

[22] Filed: Aug. 2, 1985

[30] Foreign Application Priority Data

Aug. 29, 1984 [JP] Japan ................... 59-179646
Aug. 29, 1984 [JP] Japan ................... 59-179647
Aug. 29, 1984 [JP] Japan ................... 59-179650

[51] Int. Cl.⁴ ............................... B41J 3/10
[52] U.S. Cl. ..................... 400/121; 400/61;
400/54; 400/303; 340/727; 340/731
[58] Field of Search .............. 400/54, 121, 124, 303,
400/306, 61, 62, 65; 364/200 MS File, 900 MS
File; 340/727, 731, 735; 382/46, 47

[56] References Cited

U.S. PATENT DOCUMENTS 3,991,868 11/1976 Robinson ................... 400/124
4,216,480 8/1980 Buehner ................... 40/126 X
4,400,791 8/1983 Kitado ................... 400/121 X

FOREIGN PATENT DOCUMENTS 42971 3/1984 Japan ................... 400/121

OTHER PUBLICATIONS

*IBM Tech. Disc. Bulletin*, by B. R. Cavill, vol. 24, No. 11A, Apr. 1982, pp. 5430-5432.

Primary Examiner—Paul T. Sewell
Attorney, Agent, or Firm—Finnegan, Henderson, Farabow, Garrett and Dunner

[57] ABSTRACT

In a serial printer in which character patterns for one line are image-developed in a line buffer and are printed, when the number of dots along a subscanning direction of a dot pattern obtained by expanding a standard character exceeds that of a printing head along the subscanning direction, the expanded character pattern is divided into a plurality of zones along a scanning direction, and the dot pattern for each zone is image-developed in the line buffer. Since a relative distance between a development start position and a printing head position for each character in one line is stored in advance, if character patterns are sequentially image-developed from one having a smaller relative distance, a character string including different dot structures can be printed in a desired format.

8 Claims, 28 Drawing Figures

| Da | Db | 1DOT. OFF | 1DOT. ON |
|----|----|-----------|----------|
| 0  | 0  | $T_0$     | $T_1$    |
| 0  | 1  | $T_0$     | $T_0$    |
| 1  | 0  | $T_0$     | $T_0$    |
| 1  | 1  | $T_1$     | $T_0$    |

$T_1$ $T_0$

FIG. 12
| CNTFi | ~80 |
| CODEi | ~81 | (i=1, 2---, n)
| ZONEi | ~82 |
| dHi | ~83 |
| 70i → dPi | ~84 |
| dxi | ~85 |
| dYi | ~86 |
| ATRi | ~87 |
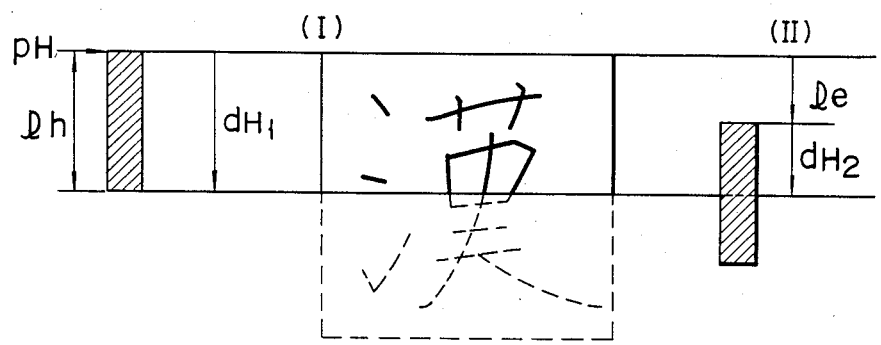
FIG. 13
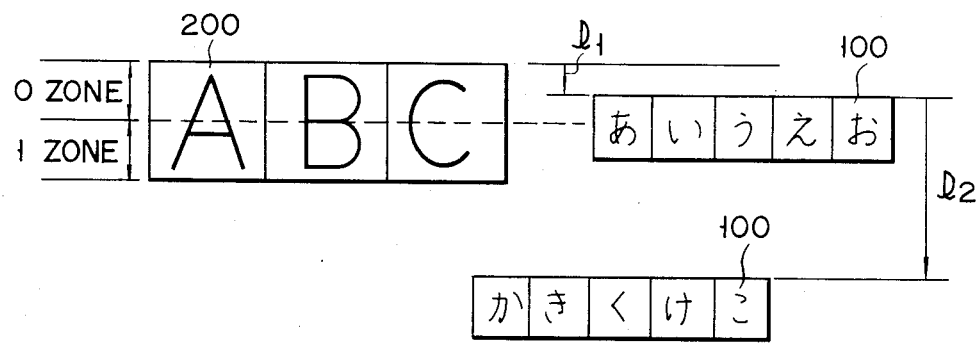
FIG. 14

F I G. 16A
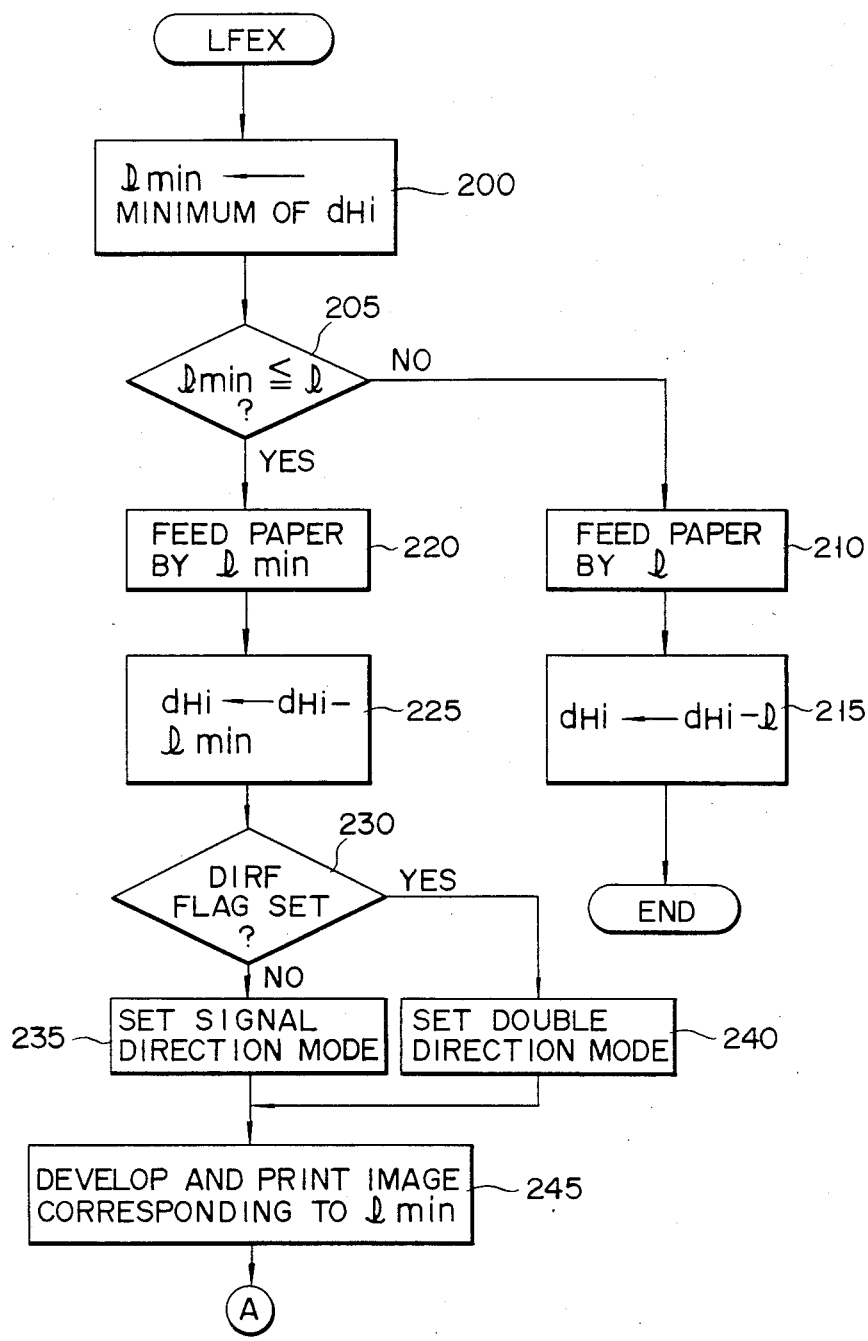

PRINTER CONTROL APPARATUS

BACKGROUND OF THE INVENTION

The present invention relates to a control apparatus for a serial printer which prints character font data of a dot matrix form and, more particularly, to a control apparatus for a printer which prints both a standard character and an expanded character (an expanded character herein includes a character obtained by simply expanding a standard character several times and a character which is expanded and modified, e.g., rotated) during one-line printing.

When a conventional serial printer completes a printing operation for one line, a predetermined amount of paper, corresponding to a line pitch, is fed, thus sequentially performing printing for each line. For this reason, when the amount of paper fed is controlled, an expanded character having a height several times that of a standard character can be printed. For example, when an expanded character having a height of 48 dots is printed using a printing head of 24-dot height, a 48-dot character is divided into two 24-dot zones, and respective zones are continuously printed without vertical separation. In other words, an upper 24-dot zone of the expanded character is printed first, paper is fed by a 24-dot height, and thereafter a lower 24-dot zone thereof is printed.

When both standard and expanded characters are printed during one-line printing, over- and under-justified printing can be performed by controlling the timing at which character data is developed in a line buffer. However, middle-justified printing cannot be performed simply by controlling a supply timing of data to the line buffer. In order to overcome this drawback, a reverse paper feed mechanism can be provided in a printer. However, since precision in the amount of paper fed cannot be maintained, a printed output is easily shifted, and the structure of a printer becomes complex, thus increasing costs.

When an expanded character is printed and the number of print dots is excessively increased, printing duty may exceed rated power and power consumption may also exceed a rated range. For example, when an underline having a 2-dot height is expanded 16 times, an underline of a 32-dot height is obtained. When this underline is printed using a printing head having a 24-dot height, all the dot printing elements are simultaneously turned on. In addition, in order to draw the underline, these elements must be continuously turned on. Therefore, power consumption is greatly increased and exceeds rated power. In order to overcome this, the capacity of a power source can be increased so as to cope even when all the dot printing elements of the printing head are simultaneously and continuously turned on. However, in this case, the power source, i.e., the overall structure of the printer becomes large in size and expensive.

Furthermore, in a conventional printer, as a printing direction mode, so-called double and single direction modes can be freely selected. In the double direction mode, printing for two lines is performed by reciprocating (moving in forward and reverse directions) the printing head, and in the single direction mode, printing is performed by moving the printing head only in the forward direction. However, when an expanded character is to be printed and the double direction mode is selected, printed dots may be shifted due to a precision error in a paper feed mechanism, thus degrading printing precision. For this reason, when the expanded character is printed, the double direction mode is not preferred. On the other hand, since a standard character is printed during one-movement of the head, when the standard character is printed, printing shift will not occur when the double direction mode is selected. Thus, in view of printing speed, the double direction mode is preferably selected for the printing of a standard character. Even when an expanded character is printed, if printing quality can be neglected, such as a test printing, the double direction mode can be selected for high-speed printing. Conventionally, printing modes are manually selected by a user, resulting in inconvenience due to an erroneous selection.

SUMMARY OF THE INVENTION

It is an object of the present invention to provide a control apparatus for a serial printer which can freely control a line pitch, and can print both a standard character and an expanded character of a dot matrix structure in a desired format including over-, under- and middle-justifying.

It is another object of the present invention to provide a printer control apparatus which can effectively control a printing of an expanded character with a power source of a small capacity without increasing power consumption if the number of print dots is greatly increased and printing duty exceeds a rated value.

It is still another object of the present invention to provide a printer control apparatus which can automatically select double and single direction modes in accordance with types of printing such as printing magnification, required printing quality, and the like.

According to an aspect of the present invention, there is provided a printer control apparatus comprising modifying means for expanding or modifying a character pattern of a dot matrix form having a predetermined dot number, means for image-developing the character pattern which is processed by said modifying means, said image-developing means dividing the character pattern into a plurality of zones along a scanning direction and image-developing the divided character pattern for each zone when the number of dots of the processed character pattern along a subscanning direction is larger than that of a line buffer along the subscanning direction, storage means for storing a zone number to be developed next, a relative distance between a development start position and a printing head position, character code data and attribute data of a character for one-line characters, paper feed control means for detecting a minimum value of the relative distance for the one-line characters stored in said storage means, developing the character patterns corresponding to the minimum value, for feeding a paper sheet by the minimum value when the minimum value is smaller than a preset amount of paper fed, and for feeding the paper sheet by the preset amount of paper fed when the minimum value is not smaller than the preset amount, and relative distance updating means for subtracting the amount of paper fed from the relative distance when the paper sheet is fed.

According to another aspect of the present invention, there is provided a printer control apparatus comprising modifying means for expanding or modifying a character pattern of a predetermined dot matrix form, a line buffer unit for storing a character pattern for one line so as to supply the stored character pattern to a printing unit, means for image-developing in said line buffer unit a character pattern processed by said modifying means, said image-developing means dividing the character pattern into a plurality of zones along a scanning direction and image-developing the divided character pattern for each zone when the number of dots of the processed character pattern along a subscanning direction is larger than that of said line buffer unit along the subscanning direction, and means for selectively omitting a part of the character pattern stored in the line buffer unit and to be supplied to a printing unit when the number of dots of the character pattern image-developed in said line buffer unit exceeds a predetermined number.

According to still another aspect of the present invention, there is provided a printer control apparatus comprising modifying means for expanding or modifying a character pattern of a predetermined dot matrix form, a line buffer unit for storing a character pattern for one line so as to supply the stored character pattern to a printing unit, means for image-developing in said line buffer unit a character pattern processed by said modifying means, said image-developing means dividing the character pattern into a plurality of zones along a scanning direction and image-developing the divided character pattern for each zone when the number of dots of the processed character pattern along a subscanning direction is larger than that of said line buffer unit along the subscanning direction, means for discriminating whether or not the image-developed character pattern is divided into zones, designating means for designating a printing mode in one of single and double direction modes, and printing direction setting means for setting the printing mode designated by said designating means when the character pattern is divided into zones, and for setting the double direction mode irrespective of designation of said designating means when the character pattern is not divided into zones.

BRIEF DESCRIPTION OF THE DRAWINGS

Other objects and features of the present invention will be apparent from the following descriptions when taken in connection with the accompanying drawings, in which:

FIG. 12 is a detailed block diagram of a character data buffer shown in FIG. 1;

FIG. 13 shows a relative distance between the printing head and a lower end of the printed character dot;

FIG. 14 shows an example of a mix printing of standard characters and extended characters;

FIGS. 16A and 16B show a flow chart of paper feed processing;

DETAILED DESCRIPTION OF THE PREFERRED EMBODIMENT

Figure 1:
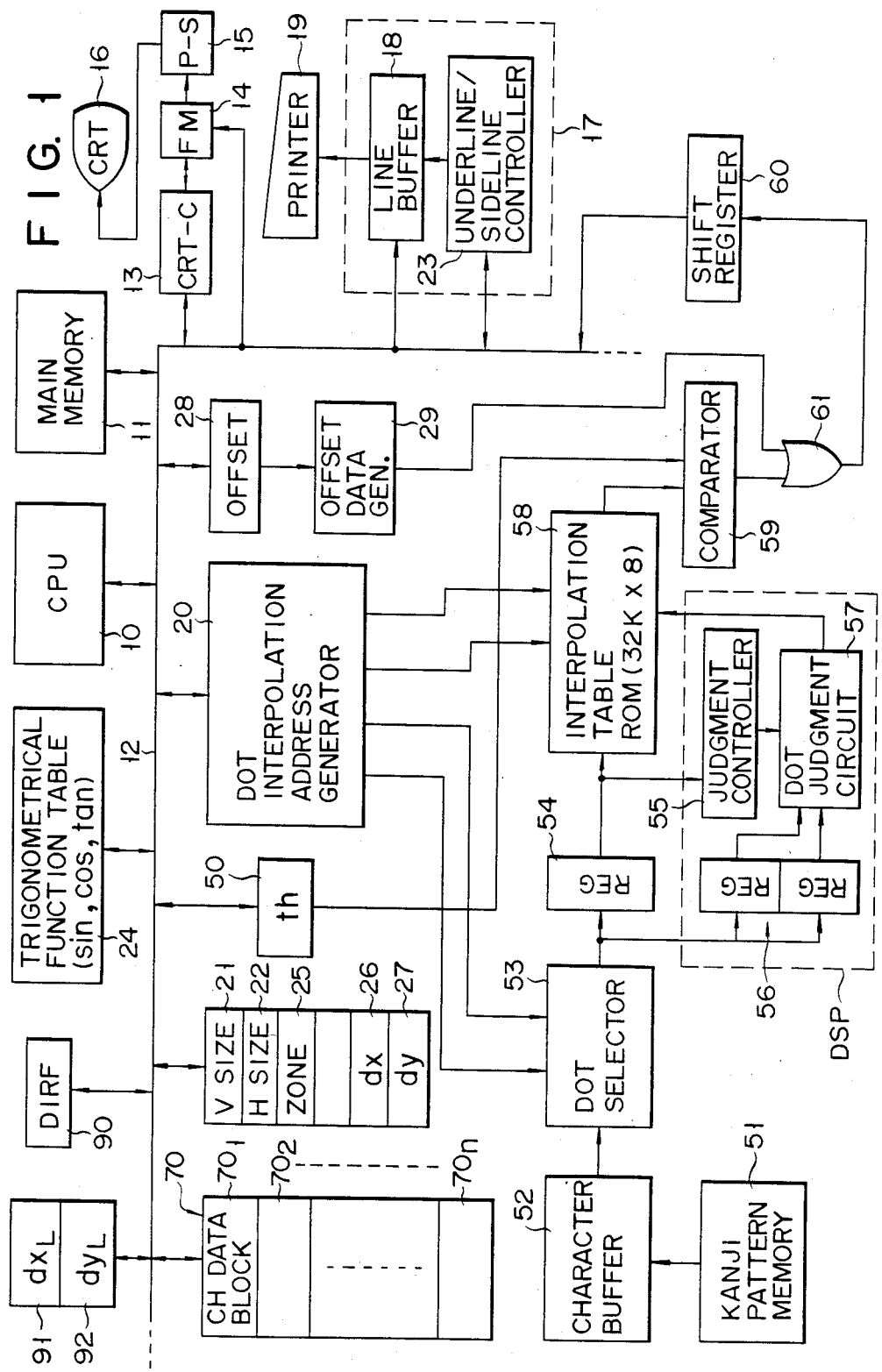
FIG. 1 is a block diagram of an embodiment of a printer control apparatus according to the present invention.

A printer control apparatus according to an embodiment of the present invention will be described with reference to the accompanying drawings. Referring to FIG. 1, the printer control apparatus comprises a CPU 10 for controlling the overall operation of the system, a main memory (MM) 11, a display control circuit (CRT-C) 13, a frame memory (FM) 14, a parallel-serial converter 15, a CRT display (CRT) 16, a printer control section 17, a line buffer 18, a serial dot printer 19 and a dot interpolation address generator 20.

A register 21 represents a size (i.e., a V size) corresponding to a width (i.e., [main scanning pitch]×[number of times]) of the subscanning direction which is obtained after a character pattern is converted. A register 22 represents a size (i.e., an H size) corresponding to the width along the main scanning direction. An underline/sideline controller 23 generates a dot pattern of the underline/sideline having a length represented by the content of the register 21. The generated underline/sideline pattern is written in the buffer 18. A trigonometric function table 24 stores angle data (i.e., trigonometric function data) corresponding to an angle designated when the character is inclined or rotated. A register 25 is used for zone designation wherein a pattern-converted character pattern is divided into zones in units of reference character heights upon pattern conversion of a character. Registers 26 and 27 store a dot pitch (dx,dy) determined by a magnification/contraction coefficient. An offset register 28 is used to selectively give an offset value to the pattern-converted character within a range of 0 through 7 dots. An offset data generator 29 generates offset data ("0" for nondisplay) in accordance with the dot number given by the offset value of the register 28.

Figure 2:
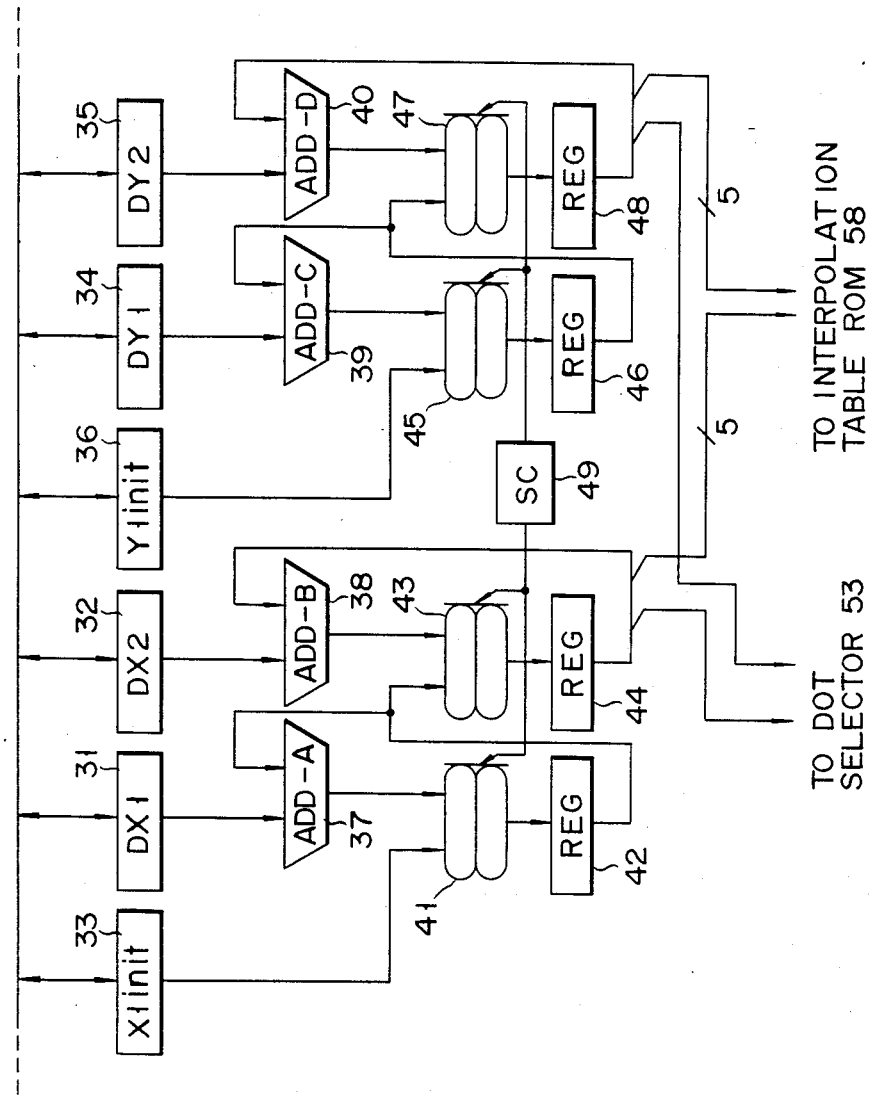
FIG. 2 is a block diagram of a dot interpolation address generator shown in FIG. 1.

With reference to FIG. 2, a register 31 in the dot interpolation address generator 20 stores an x-component of dot pitch (DX1) along the subscanning direction. A register 32 stores an x-component of dot pitch (DX2) along the main scanning direction. A register 33 stores an x-component of initial address (Xlinit) along the main scanning direction. A register 34 stores a y-component of dot pitch (DY1) along the subscanning direction. A register 35 stores a y-component of dot pitch (DY2) along the main scanning direction. A register 36 stores a y-component of initial address (Ylinit) along the subscanning direction. Each of the dot interpolation addresses stored in the registers 31 through 36 comprises integral part data and decimal part data. An adder (ADD-A) 37 adds the content of the register 31 and the content of the register 42 which represents the x-component of the dot position along the subscanning direction. An adder (ADD-B) 38 adds the content of the register 32 and the content of a register 44 which represents the x-component of the dot position along the main scanning direction. An adder (ADD-C) 39 adds the content of the register 34 and the content of the register 46 which represents the y-component of the dot position along the subscanning direction. An adder (ADD-D) 40 adds the content of the register 35 and the content of the register 48 which represents the y-component of the dot position along the main scanning direction.

A data selector 41 selects the content of the register 33 when one-character dot interpolation is started. Every time main scanning is performed, the selector 41 selects the output from the adder 37. The register 42 stores a new x-component of the dot address which is selected by the selector 41 and which comprises the integral and decimal parts. A data selector 43 selects the content of the register 42 when main scanning is started. Every time one-dot interpolation is performed, the selector 43 selects the output from the adder 38. The register 44 stores a new x-component of the dot address which is selected by the selector 43. A data selector 45 selects the content of the register 36 when one-character dot interpolation is started. Every time main scanning is performed, the selector 45 selects the output from the adder 39. The register 46 stores a new y-component of the dot address which is selected by the selector 45 and which comprises the integral and decimal parts. A data selector 47 selects the content of the register 46 when main scanning is performed. Every time one-dot interpolation is performed, the selector 47 selects the output from the adder 40. The register 48 stores a new y-component of the dot address selected by the selector 47. A selection controller (SC) 49 controls the selectors 41, 43, 45 and 47.

Returing to FIG. 1, a register 50 stores a comparison value, i.e., a threshold value (th) to be compared with an interpolated value to be described later.

A kanji pattern memory (KPM) 51 stores character pattern data including kanji (i.e., Japanese characters) in a predetermined dot matrix (16×16 dots). A one-character buffer 52 comprises a high-speed RAM which stores a one-character dot pattern read out from the memory 51. In this case, the buffer 52 stores a one-character dot pattern surrounded by a bit pattern of off dots ("0"). A dot selector 53 selects dot data of a four-dot matrix for surrounding the new dots from the character pattern data of the buffer 52 in accordance with the integral part data stored in the registers 44 and 48. A register 54 stores four-dot data generated from the selector 53. A dot pattern recognition section (DSP) represented by reference numerals 55 through 57 recognizes the dot data pattern generated from the selector 53 and selectively controls an interpolated value of the new dot surrounded by four dots. More specifically, a judgement controller 55 recognizes a four-dot pattern state in accordance with the bit contents of the register 54. When the state is detected to be a specific status (to be described later), the controller 55 controls the selector 53 which sequentially selects two-dot matrix data whose pattern surrounds the specific dot pattern. A register 56 stores dot data of two-dot matrix surrounding the specific four dots. A dot judgment circuit 57 generates a one-bit interpolated value selection signal in accordance with the dot pattern states of the two-dot matrix data read out under the control of the controller 55 and the dot data stored in the register 54. An interpolation table ROM 58 receives the decimal part (i.e., the offset value including a 5-bit x component along the main scanning direction) stored in the register 44, the four-dot data stored in the register 54 and the one-bit interpolated value selection signal generated from the circuit 57 and generates a new dot interpolated value (Qxy) within the area surrounded by the specific four dots. In this embodiment, the ROM 58 comprises a 256-kbit (32 kbits×8 bits) mask ROM. The ROM 58 generates an 8-bit (0 through 255 levels) interpolated value in response to the 15-bit read address.

A comparator 59 compares the interpolated value generated from the ROM 58 with the threshold value stored in the register 50. When the interpolated value exceeds the comparison value, i.e., the threshold value, the comparator 59 generates a signal of "1" level representing an on dot (i.e., a bright dot). A shift register 60 sequentially receives dot data generated from the comparator 59 or an offset data supplied from the offset data generator 29 through an OR gate 61 and generates the dot data onto a CPU bus 12 every time the dot data is stored in units of write bits (8 bits in this embodiment) of the memory in which the character pattern is expanded.

A character data buffer 70 stores a code and an attribute data of a character to be printed and consists of n character data blocks $70_1$ to $70_n$ (n is a maximum number of characters which can be printed on one line). The detail of each character data block $70_i$ will be described later with reference to FIG. 12.

A printing mode control flag (DIRF) 90 specifies the printing direction mode. The DIRF is set to "1" when the double direction mode is specified, i.e., printing for two lines is performed by reciprocating the printing head.

A pair of registers 91 and 92 is used for controlling the power consumption if the character is excessively expanded and the power consumption is greatly increased. It is judged whether or not the magnification of the expanded character is over the threshold magnification based on the dot pitch of the expanded character pattern. The threshold dot pitches $dx_L$ and $dy_L$ the x and y directions are stored in the registers 91 and 92, respectively.

FIGS. 3A through 11 are representations for explaining the operation of the dot interpolation control system having the arrangement described above.

FIGS. 3A through 3F are representations each showing the relationship between the four-dot data (i.e., the dot pattern) of one matrix for surrounding a new dot to be obtained by interpolation, level segments of the interpolated value set in the ROM 58 and the type of table. It should be noted that the interpolated values are represented by 0 through 255 luminance levels (i.e., density levels), and that the segments are represented by contours.

Figure 3A:
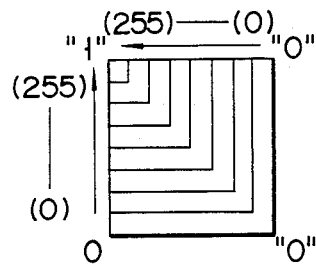
FIGS. 3A through 3F are respectively representations each showing a relationship between a dot pattern in a four-dot matrix surrounding new dots generated by 5D dot interpolation, level segments of the interpolated values set in an interpolation table ROM, and a type of table.
Figure 3B:
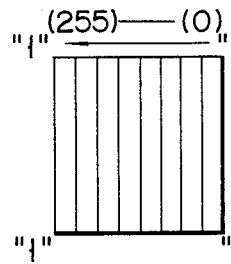
Figure 3C:
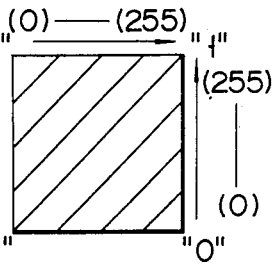
Figure 3D:
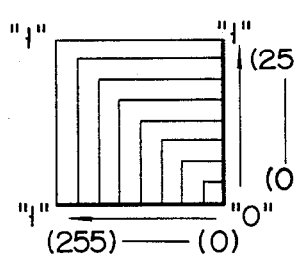
Figure 3E:
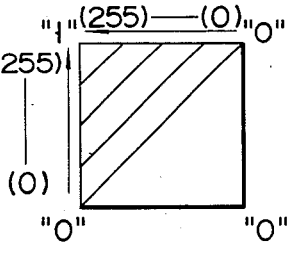
Figure 3F:
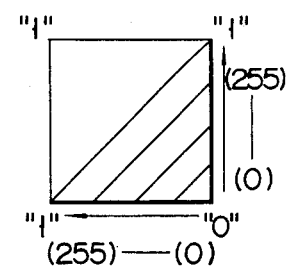
Figure 4:
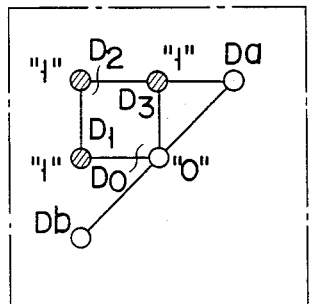
FIG. 4 is a representation for explaining selection of the type of table.
Figure 4:
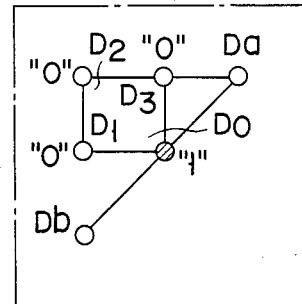
Figure 4:
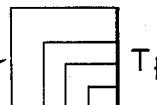
Figure 4:
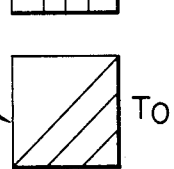

FIG. 4 is a representation for explaining table type selection when one of the four dots of the pattern is set to be on ("1") or off ("0"). The section (DSP) recognizes the on/off states of specific dots (Da, Db) adjacent to the on/off dot, i.e., "0" (D0 given by a hollow circle) when only one of the four dots (D0, D1, D2 and D3) is set to be "0". When the section (DSP) detects that Da,Db="1", a table T1 of a corner type shown in FIG. 3D is selected. However, when at least one of the dots Da and Db is set to be "0" level, a table T0 of an inclination type shown in FIG. 3F is selected. The interpolated value of a new dot located within the four-dot area is determined by the adjacent dot states when the four dots form a specific pattern as described above.

Figure 5A:
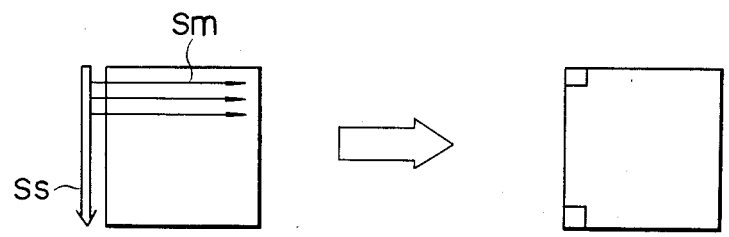
FIGS. 5A through 5D are representations showing examples of pattern conversion, respectively.
Figure 5B:
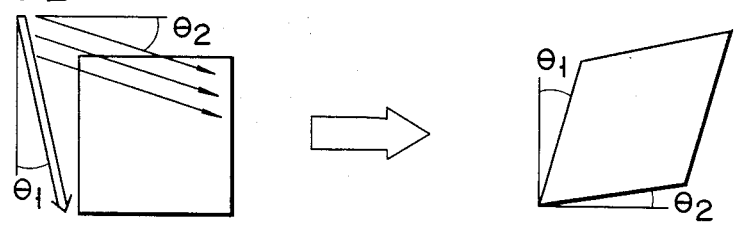
Figure 5C:
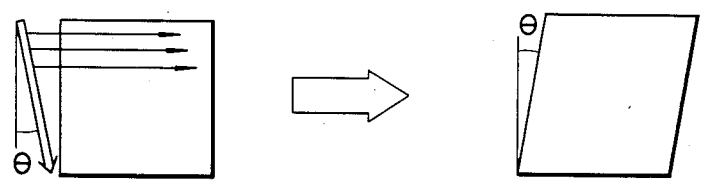
Figure 5D:
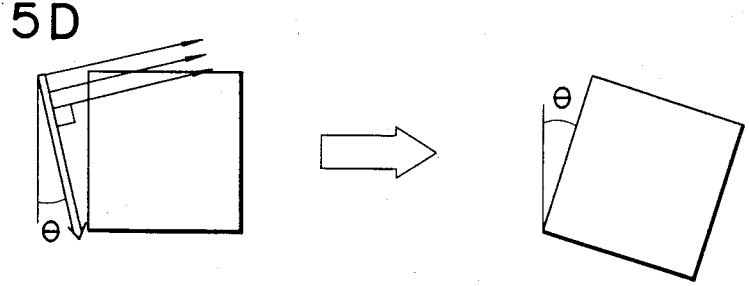

FIGS. 5A through 5D respectively show examples of pattern conversion. FIG. 5A shows a non-inclined character (i.e., a contracted character and a standard character), FIG. 5B shows an inclined character, FIG. 5C shows an under-justified inclined character, and FIG. 5D shows a rotated character. It should be noted that reference symbols Sm and Ss denote the main scanning and subscanning directions, respectively.

Figure 6A:
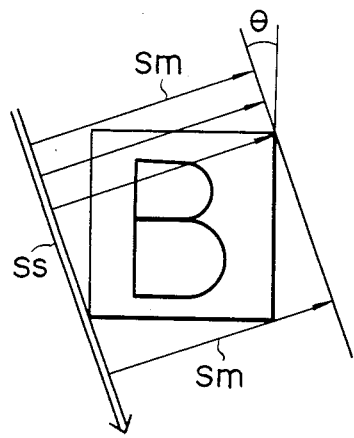
FIGS. 6A and 6B are respectively representations showing a comparison between main scanning and subscanning directions of the CRT display and those of the printout.
Figure 6B:
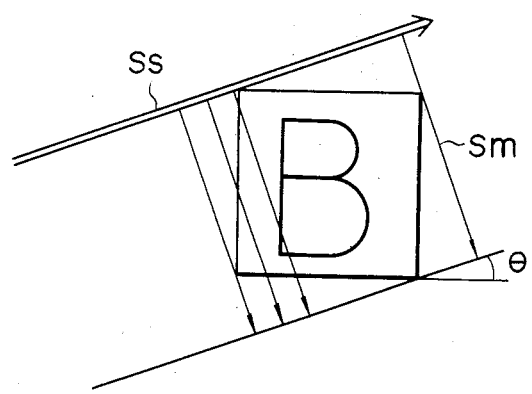

FIGS. 6A and 6B respectively show relationships between an output object (i.e., an image output object) of the dot interpolation and the main scanning and subscanning directions Sm and Ss during interpolation. More particularly, FIG. 6A shows the main scanning and subscanning directions during the CRT display operation when dot interpolation is performed, and FIG. 6B shows the main scanning and subscanning directions during the printout operation when dot interpolation is performed. The main scanning and subscanning directions in the CRT display mode are reversed in the printout mode.

Figure 7:
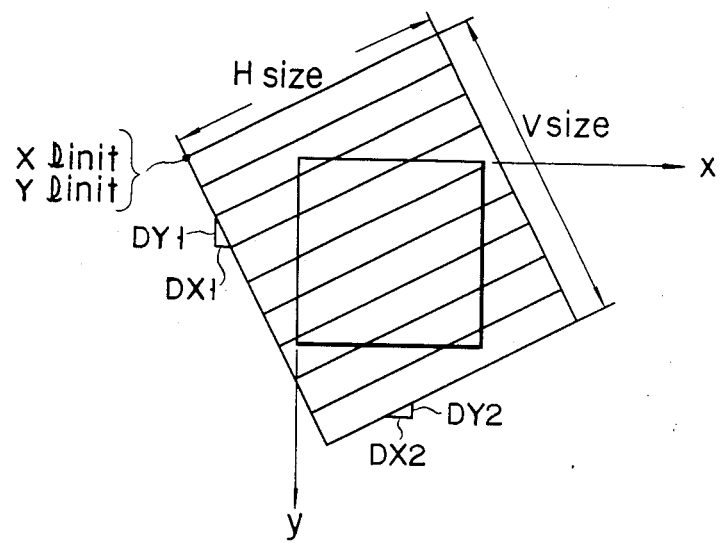
FIG. 7 is a representation showing relationships among various input data.

FIG. 7 is a representation showing the relationships among the different input data.

Figure 8:
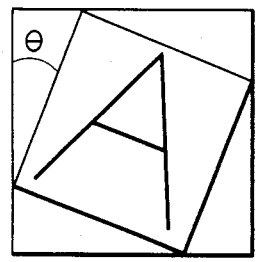
FIG. 8 is a representation showing a relationship between a character which is pattern-converted by dot interpolation and a rectangle circumscribing the pattern-converted character.

FIG. 8 is a representation showing the relationship between a character which is pattern-converted by dot interpolation and a rectangle (including a square) circumscribing the pattern-converted character.

Figure 9:
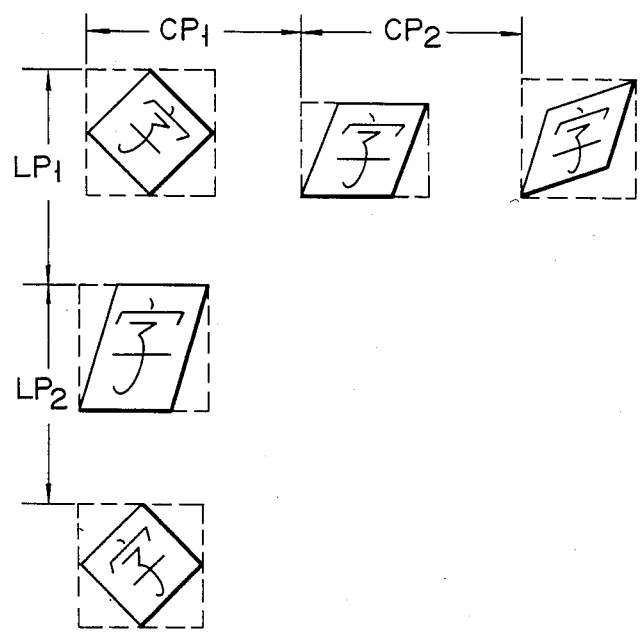
FIG. 9 is a representation showing the different character and line pitches of different modified characters.

FIG. 9 is a representation showing different character pitches CP and different line pitches LP of the different modified characters.

Figure 10:
FIG. 10 is a representation showing expansion of underlines for different modified characters.

FIG. 10 is a representation showing cases wherein underlines are expanded for the different modified characters.

Figure 11:
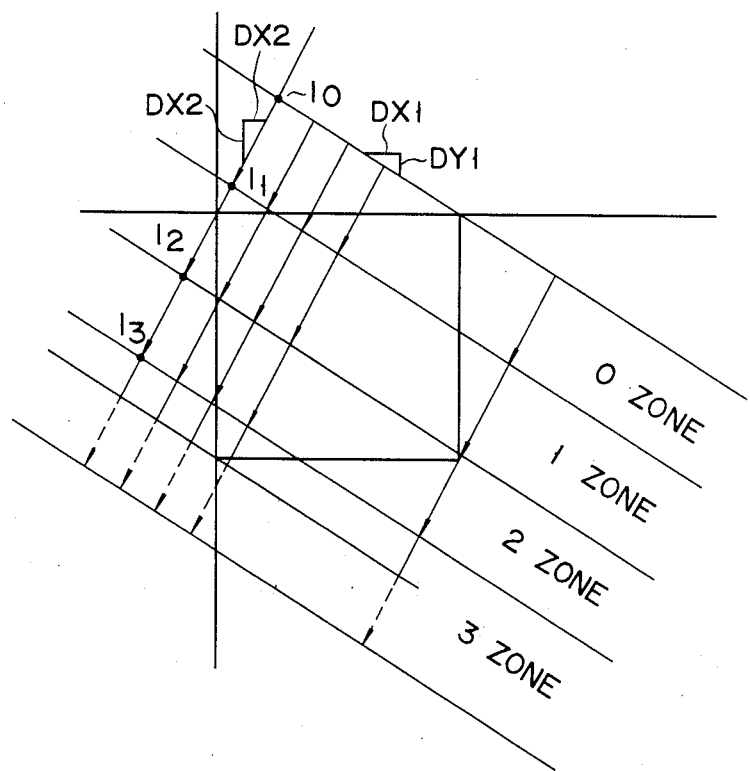
FIG. 11 is a representation for explaining a zone dividing means.

FIG. 11 is a representation for explaining the zone designation operation.

FIG. 12 shows a character data block $70_i$ in the character data buffer 70 shown in FIG. 1 in more detail. A flag portion 80 stores a control flag $CNTF_i$ indicating the state of the data block $70_i$. A character code portion 81 stores a printing character code $CODE_i$. A zone designating portion 82 stores a value $ZONE_i$ of a zone to be developed next. A relative distance storage portion 83 stores a relative distance $dH_i$ between the upper end of the printing head and the lower end of a printed dot. A pointer portion 84 stores a write start address $dP_i$ of the line buffer 18. A dot pitch storage portions 85 and 86 store dot pitches $dx_i$ and $dy_i$ in accordance with expansion and condensing magnifications. An attribute data storage portion 87 stores attribute data $ATR_i$ needed for character modification such as rotating angle data when a rotated character is to be obtained.

FIGS. 13 and 14 are views for explaining the printing operation in which a standard character and an expanded character are obtained by the above dot interpolation processing. FIG. 13 shows a relative distance dH between the printing head (indicated by a hatched rectangle) in a serial printer 19 and a lower end of the printed character dot (upper half zone of " 漢 "). Referring to FIG. 13, reference symbol lh denotes a printing character head night; and le, the amount of paper fed. It should be noted that the relative distance $dH_1$ indicated by (I) at the left of FIG. 13 represents a state immediately after a first zone of an expanded character is printed, and $dH_1$=lh. On the other hand, the relative distance $dH_2$ indicated by (II) at the right of FIG. 13 represents a state after paper is fed by le after the state (I), and in which $dH_2$=lh−le, where le≦lh.

FIG. 14 shows an example wherein both standard and expanded characters are printed. In FIG. 14, a standard character string 100 and a character string 200 in which the standard characters are expanded twice both along the vertical and horizontal directions are shown.

Figure 15:
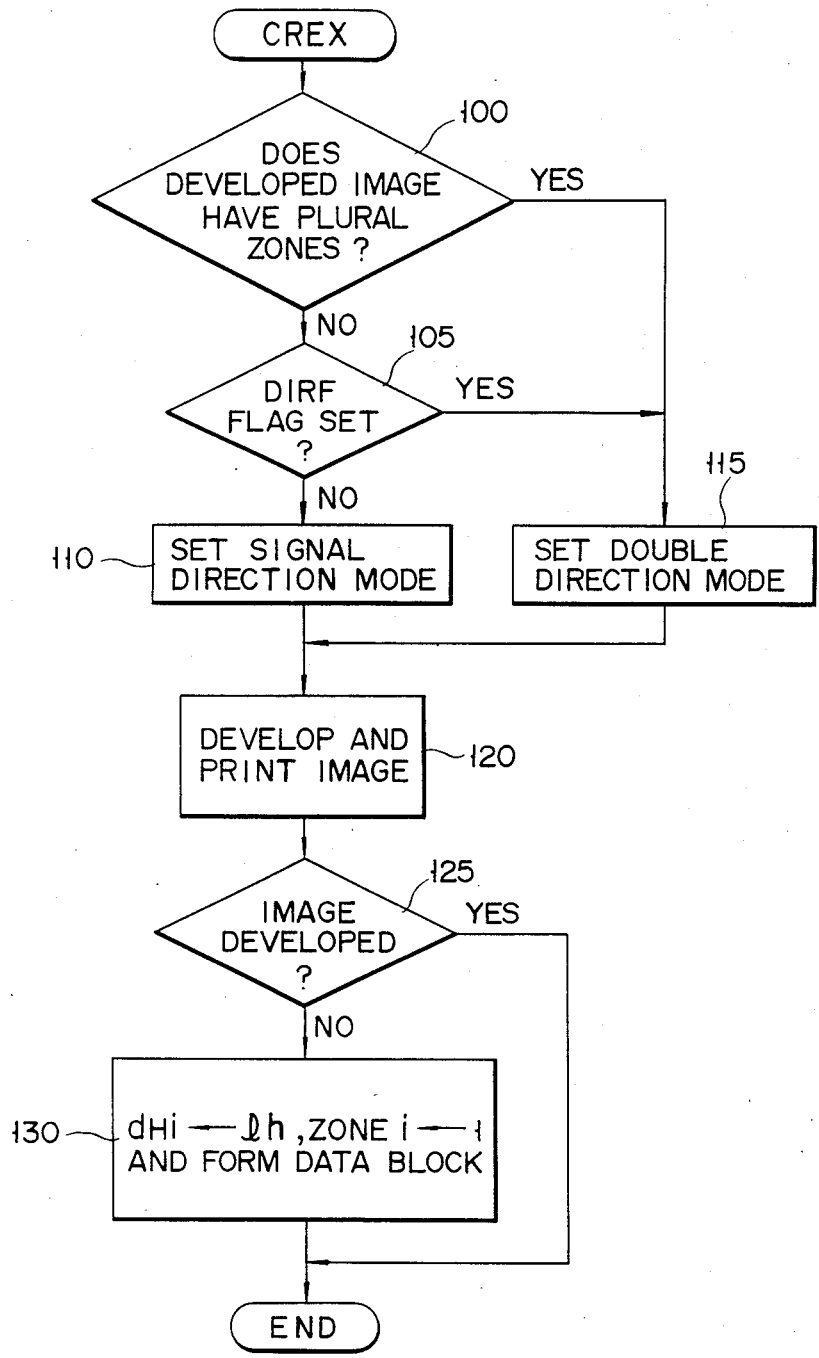
FIG. 15 is a flow chart showing printing start processing.

FIG. 15 is a flow chart showing printing start processing (CREX) for one line in this embodiment.

Figure 16B:
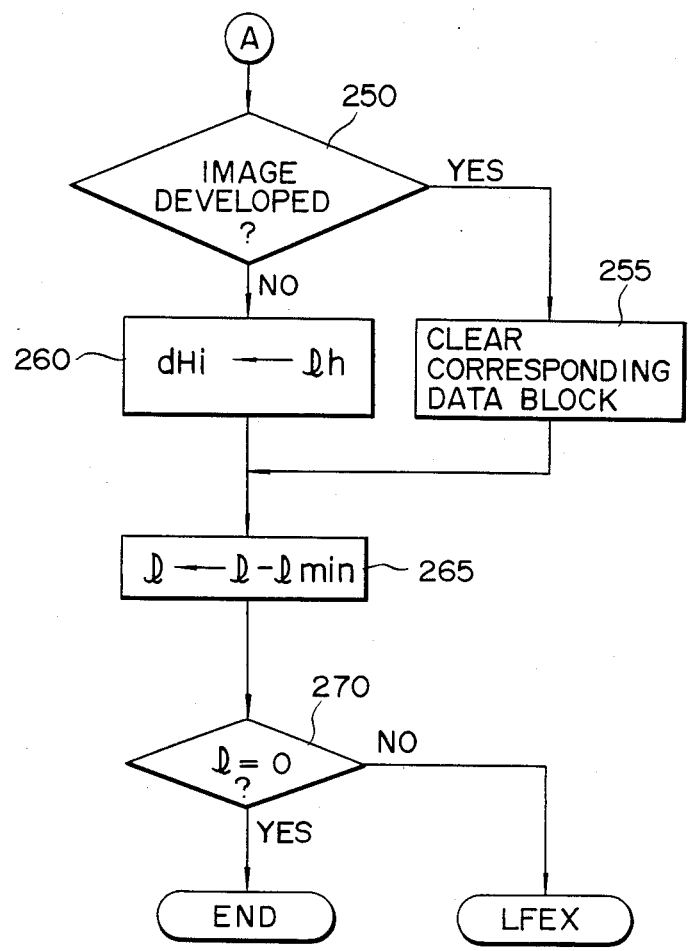

FIGS. 16A and 16B show a flow chart of paper feed processing (LFEX) in this embodiment.

Figure 17:
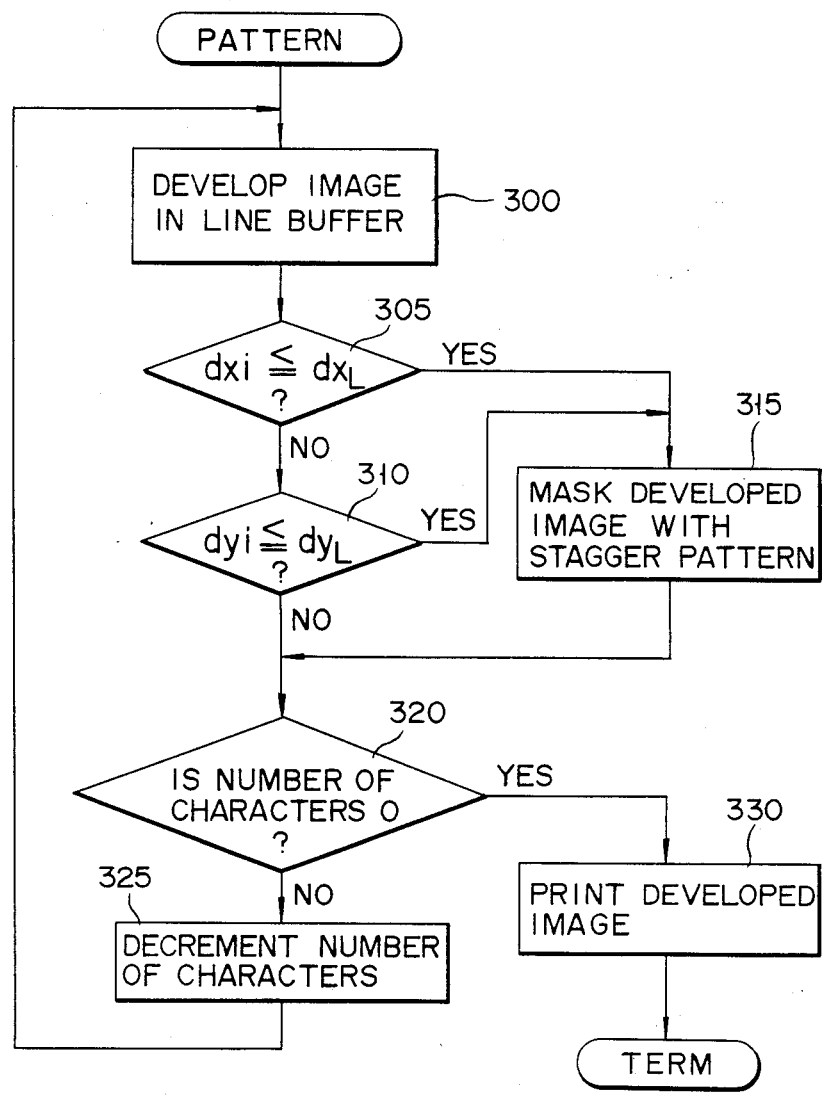
FIG. 17 is a flow chart showing in more detail image-developing/printing processing in the flow charts shown in FIGS. 15, 16A and 16B.

FIG. 17 is a flow chart showing in more detail image-developing/printing processing (PATERN) of the character code in the line buffer in the flow charts shown in FIGS. 15, 16A and 16B.

Figure 18:
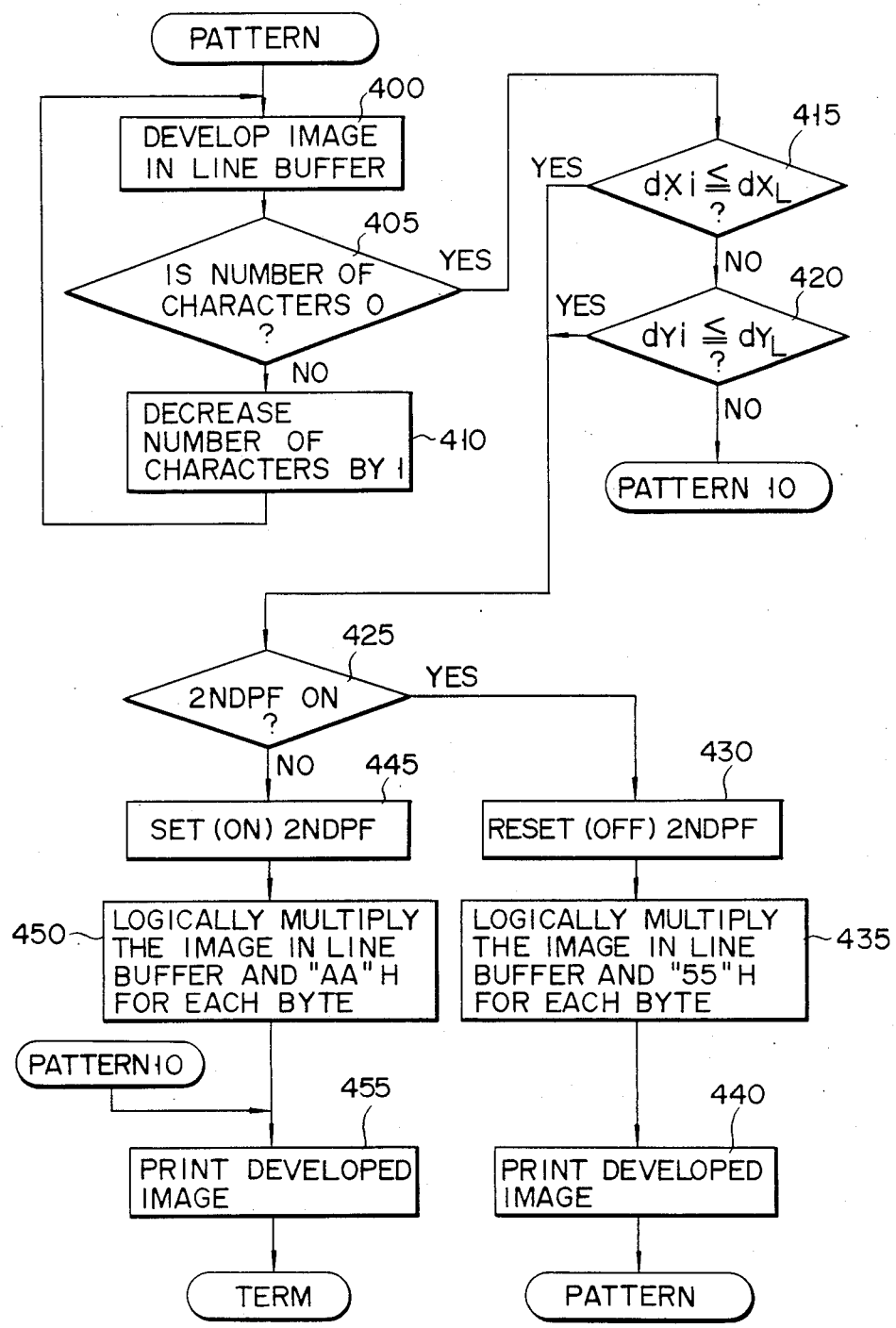
FIG. 18 is a flow chart showing in more detail image-developing/printing processing.

FIG. 18 is a flow chart showing in more detail image-developing/printing processing (PATERN) of the character code in the line buffer according to a second embodiment.

With the above arrangement, the operation of the apparatus according to the first embodiment will be described. First, a dot interpolating operation for obtaining an expanded character pattern will be described with reference to FIGS. 1 to 11.

When the character code string to be printed is externally supplied together with attribute data, each piece of data is stored in each block $70_i$ in the buffer 70 in units of characters under the control of the CPU 10. In other words, the character code $CODE_i$ to be printed is set in the character code portion 81 of the block $70_i$, the attribute data $ATR_i$ is set in the attribute data portion 87, and the flag $CNTF_i$ is set in the control flag portion 80, thus completing data initialize. Excluding the character code string and the attribute data, a threshold value (th: a reference value for making comparison with the interpolation value produced by the interpolation table ROM 58) and various dot interpolation designating data such as expansion and condensing magnifications of the character pattern with respect to the respective character codes are stored in the predetermined working area of the main memory 11. Furthermore, when dot interpolation is performed, the CPU 10 generates control data for the data for which the control flag is set in each block $70_i$ in the buffer 70 in accordance with the externally supplied dot interpolation designating data. Then, the CPU 10 initializes various registers for dot interpolation in units of characters to be developed with reference to the content of each block $70_i$.

When dot interpolation input data are externally supplied to the CPU 10 so as to perform dot interpolation, the CPU 10 initializes the various registers. More specifically, the CPU 10 sets a comparison value, i.e., the threshold value th to be compared with each interpolated value generated from the ROM 58. A dot pitch (dx,dy: an inverse value of the magnification/contraction coefficient) as a reference of the designated magnification/contraction coefficient is calculated. The x and y dot pitch components are set in the registers 26 and 27, respectively. In addition, when an original character is to be rotated or inclined, trigonometric function data (sin, cos, tan) corresponding to the designated angle is set in the table 24. Thereafter, the initial values (initial addresses; Xlinit and Ylinit) for producing the dot interpolation addresses and dot pitches (DX1, DY1, DX2, DY2) are calculated in accordance with the contents of the registers 26 and 27 and the trigonometric data (sin, cos, tan) stored in the table 24. The calculated data are stored in the registers 31 to 36. V and H size data (V size, H size) varying in accordance with changes in the character height and width which are caused by pattern conversion such as expansion and rotation are calculated using the contents of the registers 31 to 36. The resultant data are respectively set in the registers 21 and 22. In addition, when zone division is required, the number of zones is calculated, and the resultant data is stored in the register 25. Furthermore, when the dot-interpolated character is shifted within the range of 1 through 7 dots in the printout mode (e.g., the agate or condensed letters or the like are vertically shifted within the range of 1 through 7 dots), or when the number of dots of the pattern-converted character along the main scanning direction is not a multiple of the write width (i.e., 8 dots) of the image memory and must be matched with the byte boundary (the write width) of the image memory, an offset value falling within the range of 1 through 7 dots is set in the offset register 28.

The DIRF 90 is set according to the printing direction mode. It is set to "1" when the double direction mode is specified.

The threshold dot pitches $dx_L$ and $dy_L$ are respectively stored in the registers 91 and 92.

When initialization of the respective registers is completed, the CPU 10 produces the following dot interpolation addresses.

The overall operation will be described by exemplifying a case wherein a non-inclined letter (or contracted or expanded letter) is defined as an output object and is processed (e.g. simple expansion or contraction). In the dot interpolation mode, data "0" is set in the register 31, the x-component dot pitch dx is set in the register 32, an x-component initial value sx along the main scanning direction Sm is set in the register 33, a y-component dot pitch dy is set in the register 34, data "0" is set in the register 35, and a y-component initial value sy along the subscanning direction Ss is set in the register 36.

The x- and y-component dot pitches dx and dy respectively set in the registers 32 and 34 are given as inverse numbers of the magnification/contraction coefficient. The x-component initial value sx stored in the register 33 is given as $Ix=(dx-1)/2$. The y-component initial value sy stored in the register 36 is given as $Iy=(dy-1)/2$. When the data dx or dy is less than "1", i.e., when an expanded letter is to be produced, the data Ix or Iy is negative, thus representing addresses excluding the original character pattern memory area of the buffer 52. However, when the data dx or dy is more than "1", i.e., when a contracted letter is to be produced, the data Ix or Iy is positive, thus representing an address within the original character pattern storage memory area of the buffer 52. The comparison value, i.e., the threshold value th of any level (0 through 255 levels) is set in the register 50 and is compared with the interpolated value generated from the ROM 58 so as to determine what levels of new dots are significant.

The CPU 10 further reads out one-character dot pattern data as the dot interpolation object from the memory 51 and writes the readout data in the buffer 52.

In this case, the one-character dot pattern data as the dot interpolation object is stored such that the dot pattern of one character is surrounded by "0" dots which are insignificant dots.

When the data are set in the registers 31 through 36 and the character pattern subjected to interpolation is set in the buffer 52, the data sx and sy as initial dot addresses stored in the registers 33 and 36 are respectively stored in the registers 42 and 46 under the control of the control circuit 49. In order to start main scanning, the data sx and sy stored in the registers 42 and 46 are selected by the selectors 43 and 47 and are stored in the registers 44 and 48, respectively.

The integral parts of the data sx and sy stored in the registers 44 and 48 are supplied to the selector 53, and the decimal parts thereof are supplied to the ROM 58.

The four-dot matrix data is selected from the buffer 52 in accordance with the integral parts supplied to the selector 53. The selected data is supplied to the ROM 58. In this case, when character expansion is to be performed, i.e., if condition dx,dy<1 is established, negative values representing the addresses excluding those of the original character pattern memory area of the buffer 52 are supplied to the selector 53. Therefore, dot selection is started from the four-dot matrix data including the dots which are not included in the original character pattern memory area. However, when the original character is to be contracted, i.e., if condition dx,dy>1 is established, positive values representing the addresses included in those for the original character pattern storage area of the buffer 52 are supplied to the selector 53. Dot selection is started from the four-dot matrix data in the original character pattern memory area.

The ROM 58 generates the x- and y-components dot interpolation addresses (a total of 10 bits) from the registers 44 and 48, the adjacent four dot data from the selector 53 and the one-bit interpolated value selection signal from the section (DSP). For example, as shown in FIG. 4, when only one dot D0 (represented by the hollow circle in FIG. 4) is kept off, i.e., "0" among the four dots D0, D1, D2 and D3, the adjacent specific dots Da and Db are subjected to on/off detection. The interpolated value selection signal is generated such that if condition Da,Db="1" is established, the table T1 of the corner type shown in FIG. 3D is selected, but that when at least one of the dots Da and Db is set to be "0", the table T0 of the inclination type shown in FIG. 3F is selected. When only one dot D0 (represented by the solid circuit in FIG. 4) among the four dots D0, D1, D2 and D3 is kept on, i.e., "1", the on/off states of the adjacent specific dots Da and Db are checked. The interpolated value selection signal is generated such that if condition Da,Db="0" is established, the table T1 of the corner type shown in FIG. 3A is selected, but that when at least one of the dots Da and Db is "1", the table T0 of the inclination type shown in FIG. 3E is selected. In this manner, when the four dots have a specific pattern, interpolated values of the new dots are determined in accordance with the on/off states of the adjacent specific dots. The 8-bit (0 through 255 levels) interpolated value generated from the ROM 58 is supplied to the comparator 59 and is compared with the comparison value, i.e., the threshold value stored in the register 36. When the interpolated value exceeds the threshold value, the comparator 59 generates a signal of "1" level. which represents a significant dot. However, when the interpolated value does not exceed the threshold value, the comparator 59 generates a signal of "0" level which represents an insignificant dot.

After the one-dot interpolated data is read out from the ROM 58, the contents of the registers 44 and 32 are added by the adder 38. The contents of the registers 48 and 35 are added by the adder 40. The sum data from the adders 38 and 40 are selected by the selectors 43 and 47 and are stored respectively in the registers 44 and 48 under the control of the circuit 49. In this case, between the registers 32 and 35 representing the dot pitches along the main scanning direction, the register 32 stores the dot pitch dx derived from the designated magnification/contraction coefficient. The register 35 stores "0" since the noninclined letter (or expanded or contracted letter) is subjected to dot interpolation. Therefore, the content (dot address) of the register 44 is sequentially updated with the dot pitch dx derived from the designated magnification/contraction coefficient every time one dot is interpolated. However, the content of the register 48 is not updated and stores the initial data. Every time one main scanning cycle is completed, the contents of the registers 42 and 31 are added by the adder 37. At the same time, the contents of the registers 46 and 34 are added by the adder 39. The sum data from the adders 37 and 39 are selected by the selectors 41 and 45 and are stored respectively in the data selectors 41 and 45 under the control of the circuit 49. In this case, between the registers 31 and 34 representing dot pitch data along the subscanning direction, the register 34 stores the dot pitch dy derived from the designated magnification/contraction coefficient. The register 31 stores "0" since the noninclined letter (or the expanded or contracted letter) is subjected to dot interpolation. Therefore, the content (dot address) of the register 46 is updated with the dot pitch dy derived from the designated magnification/contraction coefficient every time one main scanning cycle is completed. However, the content of the register 42 is not updated and stores the initial data.

In this manner, the interpolated values corresponding to the new dot addresses are read out from the ROM 58. The readout interpolated value is compared by the comparator 59 with the threshold value th stored in the register 50, thereby producing new dot data.

The new interpolated dot data generated from the comparator 59 are sequentially stored in the shift register 60 and sent out onto the CPU bus 12 in units of bytes.

In this case, when the dot-interpolated character pattern data sent onto the bus 12 is to be written in the buffer 18 in the control section 17 and corresponds to one of the cases (I) and (II), the offset data (i "0"s) is generated from the generator 29 in accordance with the offset value (i) of the offset register 28. This offset data is set in the register 60 prior to main scanning. Thereafter, the dot-interpolated data, i.e., the pattern-converted character pattern dots are written.

(I) A case wherein the offset value falling within the range of 1 through 7 dots is set in the register 28 (i.e., the interpolated agate is shifted by i dots (i=1, 2, ... 7) downward in the printout mode), and (II) A case wherein the number of dots of the pattern-converted character along the main scanning direction is not a multiple of the write width (8 dots) of the image memory which is regarded as the output object and must be matched with the byte boundary (the write width) of the image memory, thereby setting the offset value i in the register 28.

The above operation is exemplified wherein the noninclined letter (or the expanded or contracted letter) is the output object. However, in dot interpolation wherein the rotated letter or character is an output object, the predetermined trigonometric function data corresponding to the designated rotation angle is set as one element in each of the registers 31 through 36.

More particularly, if a rotation angle, the number of dots of the original font along the x direction, and the number of dots of the original font along the y direction are respectively defined as $\theta_0$, $a+1$ and $b+1$, the following data are respectively stored in the registers 31, 32, 34 and 35, respectively:

$DX1 = -dx \sin \theta_0$ $DX2 = dx \cos \theta_0$ $DY1 = dy \cos \theta_0$ $DY2 = dy \sin \theta_0$ The following data are respectively stored in the register 33 (Xlinit) and the register 36 (Ylinit) as follows:

(1) For $0° \leq \theta_0 \leq 90°$ $Xlinit = (\frac{1}{2})a(\frac{1}{2}) - (a+1-dx) \cos 2\theta_0$ $Ylinit = -(\frac{1}{2})(1-dy) - (\frac{1}{2})(a+1-dx)dy/dx \sin 2\theta_0$ (2) For $90° \leq \theta_0 \leq 180°$ $Xlinit = a + (\frac{1}{2})(1-dx) - (\frac{1}{2})(b+1-dy)dy/dx \sin 2\theta_0$ $Ylinit = (\frac{1}{2})b + (\frac{1}{2})(b+1-dy) \cos 2\theta_0$ (3) For $180° \leq \theta_0 \leq 270°$ $Xlinit = (\frac{1}{2})a + (\frac{1}{2})(a+1-dx) \cos 2\theta_0$ $Ylinit = b + (\frac{1}{2})(1-dy) + (\frac{1}{2})(a+1-dx)dy/dx \sin 2\theta_0$ (4) For $270° \leq \theta_0 \leq 360°$ $Xlinit = (\frac{1}{2})(1-dx) + (\frac{1}{2})(b+1-dy)dx/dy \sin 2\theta_0$ $Ylinit = (\frac{1}{2})b - (\frac{1}{2})(b+1-dy) \cos 2\theta_0$ The values DX1, DX2, DY1, DY2, Xlinit and Ylinit of the dot pitch data including the trigonometric function data corresponding to the rotation angle $\theta_0$ and the initial address data are calculated and are set in the corresponding registers 31 through 36. Dot interpolation address updating along the main scanning and subscanning directions is continuously performed to obtain rotated character pattern dots at the designated rotation angle $\theta_0$.

In the dot interpolation address updating for an inclined character, data including as one element the predetermined trigonometric function data of the table 24 (which represents the designated inclination angle), is stored in specific ones of the registers 31, 32, 34 and 36.

When an inclination angle, the number of dots of the original font along the x direction and the number of dots of the original font along the y direction are defined as $\theta_0$, $a+1$ and $b+1$, respectively, the following data are respectively stored in the registers 31, 32, 34 and 35:

$DX1 = dx \cdot \tan \theta_0$ $DX2 = dx$ $DY1 = dy$ $DY2 = 0$ for $0° < \theta_0 < 90°$ The following data are respectively set in the registers 33 and 36:

$Xlinit = (\frac{1}{2})(1-dx) - (b+1-dy)dx/dy \tan \theta_0$ $Ylinit = -(\frac{1}{2})(1-dy)$ By using the equations given above, the values DX1, DX2, DY1, DY2, Xlinit and Ylinit of the dot pitch data including the trigonometric function data corresponding to the designated inclination angle $\theta_0$ and of the initial address data are calculated. The calculated values are stored in the corresponding registers 31 through 36. Dot interpolation address updating along the main scanning and subscanning directions is continuously performed to obtain inclined character pattern dots for the designated inclination angle $\theta_0$.

As is apparent from the above description, the values DX1, DX2, DY1, DY2, Xlinit and Ylinit of the dot pitch data including the trigonometric function data corresponding to the designated inclination angle $\theta_0$ and of the initial address data are calculated and dot interpolation address updating along the main scanning and subscanning directions is continuously performed in response to the resultant address data to obtain new dots. The new dot data are stored in the shift register 60 in the same manner as described above and are sent onto the bus 12 in units of bytes (8 bits). The one-byte data are sequentially written in the buffer 18 in the control section 17.

In this case, the buffer 18 has a bit width (e.g., 8 in length × 3 in width = 24 dots) corresponding to the printing character height. Therefore, the modified character such as the rotated and inclined characters described above excluding the contracted character pattern cannot be fitted within the 24-dot size. In order to divide the new character pattern into a plurality of zones at the time of initialization of the registers, the CPU 10 calculates the number of zones for the designated type face and the character pattern-converted by designating the angle and the magnification/contraction coefficient and sets the zone number data in the register 25. The content of the register 25 is decremented by one every time the pattern is written in units of zones. The respective zone data are processed as those of a single character pattern until the content of the register 25 is zero. For the zones designated by the register 25, continuous bit printing can be performed without inserting a blank area (i.e., the line pitch). A zone division method is illustrated in FIG. 11.

The zone number calculating means calculates a size of a rectangle (including a square) of the x and y directions which circumscribes the character converted (modified) by the designated rotation angle/inclination angle/magnification or contraction coefficient, and also calculates the number of dots (x and y dot numbers) along the two sides circumscribed about the character. The calculated x and y dot number data are set as the V and H size data in the registers 21 and 22 at the initialization of the registers, thereby allowing the zone number to be easily identified. In other words, for the character converted at a given angle, the character writing (processing) is performed on the basis of the rectangular area which is defined by the horizontal and vertical lines and which circumscribes the character. For example, in the dot interpolation for printout operation, the H size data stored in the register 22 is divided by the bit width "24" of the buffer 18 to allow the number of zones to be easily calculated. In the dot interpolation for CRT display output, the V size data is divided by the bit width "24" of one display line to allow the number of zones to be easily calculated.

By storing the zone designation data in the register 25, the identical zone image data can be repeatedly expanded. The character pattern modified by dot interpolation can be partially or entirely printed out or displayed as a redundant modified character pattern.

The V and H size data described above can also be referred to in under/side line processing so as to set the character pitch. More particularly, in the inclined or rotated character obtained by dot interpolation upon designation of any inclination angle along the scanning direction, its height and width can vary in accordance with the inclination angle and the magnification/contraction coefficient. When the modified character is generated on the basis of row and column directions (x and y directions), the character pitch and the under/side line or the like cannot be determined by a designating means using a fixed parameter.

In order to solve the above problem, a rectangle circumscribing a character is used as a body face for the processing of the character pitch and the under/side line. The processing procedure will be described hereinafter.

Character pitch processing will be first described. Every time the one-character dot image processed by dot interpolation is regarded as the output object, e.g., every time the one-character dot image is expanded (written) in the buffer 18 in the control section 17, the CPU 10 determines whether or not the content (V size) of the register 21 is updated. If the CPU 10 determines that the content of the register 21 is not updated, data obtained by adding $\frac{1}{2}$ to the data stored therein is supplied as control data representing the character pitch to the control section 17, thereby controlling the pitch of the character data expanded in the buffer 18. However, when the CPU 10 determines that the content of the register 21 is updated, the data prior to updating is held in the specific register area. When data is to be updated, $\frac{1}{4}$ of a sum of the data prior to data updating and the updated data is added to the updated data stored in the register 21. The resultant data is supplied as control data representing the character pitch to the control section 17, thereby controlling the pitch of the character data expanded in the buffer 18.

The character converted at a given angle is written (processed) on the basis of the rectangular area defined by the horizontal and vertical lines circumscribing the character. The pitch of the adjacent two characters is therefore determined in accordance with the length (the V size for the printout mode, and the H size for the CRT display mode) of the side of the rectangle. The same pitch control as described above can be applied to the line pitch determination. The character pitches CP and the line pitches LP for the different modified characters are illustrated in FIG. 9.

Although the above-mentioned pitch control is performed by considering the area (the circumscribing rectangle) of the adjacent character, the pitch may be determined by the current value of the register 21 (or the register 22) in order to simplify processing.

The operation will be described wherein an under-/side line is generated on the basis of the circumscribing rectangle described above. In the printout mode, the data (the V size data) stored in the register 21 is referred to. In the CRT display mode, the data (the H size data) stored in the register 22 is referred to. A case will be exemplified wherein the under/side line is processed in the printout mode. The controller 23 in the control section 17 expands the underline or side line dots in the buffer 18 in accordance with the under/side line instruction included in the print control data supplied through the bus 12. However, the line expansion cannot be properly performed for the modified characters such as the rotated or inclined character on the basis of the normal character width. In order to solve the problem, the content (the V size data) of the register 21 is continuously received by the controller 23. When the under-/side line instruction is generated, the under/side line dot pattern is generated at a line length corresponding to the current content (i.e., the updated data) of the register 21, and the pattern is expanded for the corresponding modified character in the buffer 18. Examples of underline expansion for the different modified characters are respectively illustrated in FIGS. 10A through 10C.

The printing control operation wherein an expanded character obtained in the above manner and a character having another dot structure, e.g., a standard character are printed at the same time will be described with reference to FIGS. 1, 2, and 12 to 17. In this case, an example will be described wherein the standard character 100 and the character 200 which is obtained by expanding twice the standard character both in the vertical and horizontal directions are printed in a middle-justifying format, as shown in FIG. 14.

When a mixed character string as shown in FIG. 14 is printed, printing instructions (1) to (7) are externally supplied.
  (1) Set an expansion magnification (2 in the vertical and horizontal directions).
  (2) Input character codes "A", "B" and "C" and a printing start code (CR).
  (3) Input the paper feed amount l1 (l1=lh/2).
  (4) Set the magnification to a reference magnification (i.e., set the equal magnification designating the standard character).
  (5) Input character codes "あ", "い", "う", "え" and "お" and the CR code.
  (6) Input the paper feed amount l2.
  (7) Input character codes "か", "き", "く", "け" and "こ" and the CR code.

Note that in this case, the character data buffer 70 is provided independently of the main memory 11. When the buffer 70 is provided in the memory 11, the character codes are stored in data blocks in a buffer area in the memory 11.

In the printer control apparatus, the following steps are executed.
  (a) In response to the CR code in the instruction (2), the image of a zone 0 (upper half) of the characters "A", "B" and "C" which are expanded by dot interpolation (twice in the vertical and horizontal directions) are sequentially developed in the line buffer 18 and printed.

Then, the content of the corresponding data block in the buffer 70 is updated so as to prepare for printing of a zone 1 (lower half) of the expanded characters "A", "B" and "C". In this case, ZONE=1 is registered in the zone designating portion 82, and dH=lh is registered in the relative distance storage portion 83. The operation during a period of (a) is represented by the printing start processing shown in FIG. 15.
  (b) A paper sheet is fed by l1 in accordance with the paper feed instruction (3).
  (c) After (b), the value l1 is subtracted from the value dH$_i$ stored in the relative distance storage portion 83$_i$ in the data block 70$_i$ (i=1 to n), and dH$_i$ is updated. The operation during a period of (b) and (c) is represented by the paper feed processing shown in FIGS. 16A and 16B.
  (d) In response to the CR code in the instruction (5), the standard characters "あ", "い", "う", "え" and "お" are sequentially image-developed in the line buffer 18 in units of characters, and the developed images are printed. The operation during a period of (d) is represented by the printing start processing shown in FIG. 15.
  (e) Since the paper feed amount l2 in the instruction (6) exceeds the printing range of the zone 1 of the expanded character, the following processing is performed:
    (1) The paper sheet is fed by dH (in this case, the updated value, i.e., lh−l1).
    (2) The zone 1 of the expanded characters "A", "B" and "C" is printed.
    (3) Since the printing of the expanded characters "A", "B" and "C" is completed, the block data registered in the character data buffer 70 is cleared.
    (4) The remaining paper sheet (l2−dH) is fed. The operation during a period of (e) is represented by the paper feed operation shown in FIGS. 16A and 16B.
  (f) The standard characters "か", "き", "く", "け" and "こ" are sequentially image-developed in the line buffer 18 in units of characters, and the developed images are printed. The operation during a period of (f) is represented by the printing start processing shown in FIG. 15.

In this manner, the character string including the standard character 100 and the expanded character 200 (or modified character) shown in FIG. 14 can be printed in a middle-justifying format.

Respective flow charts will be described in detail. In the printing start processing shown in FIG. 15, in step 100, it is checked if the character string to be printed can be printed during the forward movement of the printing head, i.e., if the character string to be printed is comprised of standard characters. This can be discriminated by checking if the character string includes a plurality of zones. If NO in step 100, i.e., if the character string is divided into zones, it is checked in step 105 if the printing direction flag DIRF is set (="1"). If NO in step 105, the printing mode is set in the single direction mode in step 110. If YES in step 100, i.e., if it is determined that the character string is not divided into zones, the printing mode is forcibly set in the double direction mode irrespective of the state of the printing direction flag in step 115. If YES in step 105, the printing mode is set in the double direction mode in step 115. Thus, when the character pattern which can be printed by moving the printing head in the forward direction is to be printed, the double direction mode is automatically set so as to decrease a printing time, thus achieving high speed printing. When the character pattern is divided into a plurality of zones, the printing direction designated by a user can be set. When high speed printing has priority over printing quality, if the printing direction flag is set, high speed printing in the double direction mode is executed. When degradation in printing quality such as shift in printing between adjacent zones is to be prevented and high quality expanded or modified character pattern is to be obtained, if the printing direction flag is not set, the single direction mode can be executed. In this manner, according to the present invention, since the double direction mode is set for a character string which is not divided into zones, the operation can be simplified. After steps 110 and 115, in step 120, the character code set in a specified area is image-developed and is printed. In step 125, it is confirmed that image development is completed. By using the value of H size and the zone number to be developed next, it is determined that image development is completed if one zone has a 24-dot height and 24×(the number of zones)>H size.

If YES in step 125, the printing start processing is ended. If NO in step 125, lh is set for $dH_i$ and "1" is set for $ZONE_i$, and the character data block is formed using other data in step 130.

FIG. 17 shows the image development, i.e., step 120 in FIG. 15 in more detail. The character pattern is developed in the line buffer 18 in step 300. The development is performed for each character. In step 305, it is checked if $dx_i \leq dx_L$. If NO in step 305, it is checked in step 310 if $dy_i \leq dy_L$. If YES in step 305 or 310, the developed dot pattern is masked with a stagger pattern in step 315. Masking herein means that some on-dots generated by dot interpolation are disabled (i.e., converted to off-dots). Thus, even when the number of print dots is excessively increased in an expansion printing mode and printing duty exceeds the rated value, power consumption is not increased in accordance therewith and a power source of a small capacity is sufficient. When the dot pattern is masked, a resolution thereof is degraded. However, in this case, since a staggered pattern is masked, influence can be minimized. After steps 310 and 315, in step 320, it is checked if the number of characters to be developed for the line is zero. If NO in step 320, the number of characters is decreased by one in step 325 and thereafter the step 300 is performed again. If YES in step 320, since the development of characters in one line is completed, the images for one line which are developed in the line buffer 18 are printed in step 330.

In the paper feed operation in FIGS. 16A and 16B, in step 200, a minimum value $l_{min}$ is obtained from relative distances $dH_i$ (i=1 to n) in the blocks $70_i$. In step 205, it is checked if $l_{min} \leq 1$ (paper feed amount). If NO in step 205, the paper is fed by 1 in step 210. Thereafter, in step 215, the value 1 is subtracted from the relative distance $dH_i$ in the character data block $70_i$ in the buffer 70, and the resultant value is newly set as $dH_i$. If YES in step 205, the paper is fed by $l_{min}$ in step 220. Thus, since the printing order is controlled for each zone, middle-justified printing of the mixed character string can be easily performed. Thereafter, in step 225, the minimum value $l_{min}$ is subtracted from the relative distance $dH_i$ in the block $70_i$, and the resultant value is used as new $dH_i$.

Thereafter, it is checked in step 230 if the printing direction flag DIRF is set. If NO in step 230, the single direction mode is set in step 235. If YES in step 230, the double direction mode is set in step 240. Thus, in step 245, the character in the character code block correspond to the minimum value $l_{min}$ is image-developed and printed. FIG. 17 shows step 245 in more detail.

It is checked in step 250 if the image development is completed. If YES in step 250, the corresponding character data block is cleared. If NO in step 250, lh is set for $dH_i$ in step 260. After steps 255 and 260, in step 265, $1 - l_{min}$ is set for 1, and it is checked in step 270 if l=0. If YES in step 270, the operation is ended. If NO in step 270, the paper feed operation (LFEX) is restarted.

As described above, according to this embodiment, since a line pitch can be controlled for each zone, a control apparatus of a serial printer which can print both standard and expanded characters in a desired format including over-, under- and middle-justifying can be provided. When the number of print-on dots is to be increased due to expansion processing and the printing duty exceeds the rated value, since the dot pattern is masked with a staggered pattern, a printer control apparatus which can cope with such a state with a small-capacity power source without increasing power consumption can be provided. Furthermore, since the double and single direction modes are automatically selected in accordance with the types of printing such as magnification of a character to be printed, printing quality and the like, a printer control apparatus with high operability can be provided.

A second embodiment of the present invention will be described hereinafter. In the first embodiment, predetermined on-dots are turned off so as to adjust the printing duty. However, this method may degrade a resolution. In the second embodiment, such a character pattern is divided into a plurality of complementary patterns and the complementary patterns are over-printed. The second embodiment is substantially the same as the first embodiment excluding the operation of image development and printing. In other words, in the second embodiment, a flow chart shown in FIG. 18 is executed instead of that shown in FIG. 17.

Referring to FIG. 18, in step 400, a character pattern is developed in the line buffer 18. The development is performed for each character. It is checked in step 405 if the number of characters to be developed for the line is zero, i.e., if all the characters in one line are developed. If NO in step 405, the number of characters is decremented by one in step 410, and the flow returns to step 400. If YES in step 405, it is checked in step 415 if $dx_i \leq dx_L$. If NO in step 415, it is checked in step 420 if $dy_i \leq dy_L$. If NO in step 420, the character patterns for one line developed in the line buffer 18 are printed in step 455. If YES in step 415 or 420, it is checked in step 425 if 2NDPF (flag indicating second image development) is ON. Thus, in the case of first printing, 2NDPF is set (ON) in step 445, and the dot image developed in the line buffer 18 is logically multiplied with "A A"H("1010 1010") in units of bytes in step 450, and the logical product is developed in the line buffer 18 again. In step 455, the dot pattern in the line buffer 18 is printed. In the case of second printing, 2NDPF is reset (OFF) in step 430, and the dot image developed in the line buffer 18 is logically multiplied with "5 5" H("0101 0101") in units of bytes in step 435, and the logical product is developed in the line buffer 18 again. So-called complementary data in which "0" and "1" are inverted are used as the data logically multiplied with the developed pattern in the first and second printings. In step 440, the dot patterns in the line buffer 18 are printed.

According to the second embodiment, since the dot patterns in the line buffer are masked with two types of complementary patterns and are printed by two printing operations, the printing duty can be adjusted without degrading the resolution.

The present invention is not limited to the above embodiments. A method for setting a printing format of the mixed character string can be changed as desired.

What is claimed is:

1. A printer control apparatus comprising:
   modifying means for expanding or modifying a character pattern of a dot matrix form having a predetermined dot number;
   means for image-developing the character pattern which is processed by said modifying means, said image-developing means dividing the character pattern into a plurality of zones along a scanning direction and image-developing the divided character pattern for each zone when the number of dots of the processed character pattern along a subscanning direction is larger than that of a line buffer along the subscanning direction;
   storage means for storing a zone number to be developed next, a relative distance between a development start position and a printing head position, character code data and attribute data of a character for at least one-line characters;
   paper feed control means for detecting a minimum value of the relative distance for the one-line characters stored in said storage means, developing the character patterns corresponding to the minimum value, for feeding a paper sheet by the minimum value when the minimum value is smaller than a preset amount of paper fed which is determined by a line pitch, and for feeding the paper sheet by the preset amount of paper fed when the minimum value is not smaller than the preset amount; and
   relative distance updating means for subtracting the amount of paper fed from the relative distance when the paper sheet is fed.

2. A printer control apparatus for use with a printing unit comprising:
   modifying means for expanding or modifying a character pattern of a predetermined dot matrix form;
   a line buffer unit for storing a character pattern for one line so as to supply the stored character pattern to the printing unit;
   means for image-developing in said line buffer unit a character pattern processed by said modifying means, said image-developing means dividing the character pattern into a plurality of zones along a scanning direction and image-developing the divided character pattern for each zone when the number of dots of the processed character pattern along a subscanning direction is larger than that of said line buffer unit along the subscanning direction; and
   means for selectively omitting a part of the character pattern stored in said line buffer unit and to be supplied to the printing unit when the number of dots of the character pattern image-developed in said line buffer unit exceeds a predetermined number.

3. A printer control apparatus according to claim 2, wherein said selective omitting means masks the character pattern developed in said line buffer unit with a staggered pattern.

4. A printer control apparatus according to claim 2, wherein said image-developing means image-develops an identical character pattern a plurality of times when the number of dots of the character pattern developed in said line buffer unit exceeds the predetermined number, and said selective omitting means masks the character patterns developed in said line buffer unit with different patterns in which dots of the masked character patterns do not overlap each other, the masked patterns being overprinted.

5. An apparatus according to claim 4, wherein said image developing means image-develops twice an identical character pattern when the number of dots of the character pattern image-developed in said line buffer unit exceeds the predetermined number, and said selective omitting means masks two character patterns developed in said line buffer unit with complementary patterns, the masked character patterns being overprinted.

6. A printer control apparatus according to claim 2, wherein said selectively omitting means comprises means for overriding a mask pattern in said line buffer unit.

7. A printer control apparatus according to claim 2, wherein said omitting means comprises means for generating a detection signal when the number of dots of the character pattern to be image-developed in said line buffer unit exceeds a predetermined number, and said image developing means comprises means for masking the character pattern processed by said modifying means with a mask pattern and means for image-developing in said line buffer unit the mask character patterns.

8. A printer control apparatus comprising:
   modifying means for expanding or modifying a character pattern of a predetermined dot matrix form;
   a line buffer unit for storing a character pattern for one line so as to supply the stored character pattern to a printing unit;
   means for image-developing in said line buffer unit a character pattern processed by said modifying means, said image-developing means dividing the character pattern into a plurality of zones along a scanning direction and image-developing the divided character pattern for each zone when the number of dots of the processed character pattern along a subscanning direction is larger than that of said line buffer unit along the subscanning direction;
   means for discriminating whether or not the image-developed character pattern is divided into zones;
   designating means for designating a printing mode in one of single and double direction modes; and
   printing direction setting means for setting the printing mode designated by said designating means when the character pattern is divided into zones, and for setting the double direction mode irrespective of the designation of said designating means when the character pattern is not divided into zones.

* * * * *